(12) United States Patent
Kwatra et al.

(10) Patent No.: US 11,861,618 B2
(45) Date of Patent: Jan. 2, 2024

(54) PROXIMAL DISTANCE AND USAGE PATTERN ACCESS MANAGEMENT

(71) Applicant: INTERNATIONAL BUSINESS MACHINES CORPORATION, Armonk, NY (US)

(72) Inventors: Shikhar Kwatra, San Jose, CA (US); Adam Lee Griffin, Dubuque, IA (US); Jeremy R. Fox, Georgetown, TX (US); Zachary A. Silverstein, Jacksonville, FL (US)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 17/027,882

(22) Filed: Sep. 22, 2020

(65) Prior Publication Data
US 2022/0092604 A1    Mar. 24, 2022

(51) Int. Cl.
*G06Q 20/40* (2012.01)
*G06Q 20/32* (2012.01)

(52) U.S. Cl.
CPC ... *G06Q 20/40155* (2020.05); *G06Q 20/3224* (2013.01); *G06Q 20/4014* (2013.01); *G06Q 20/4093* (2013.01)

(58) Field of Classification Search
CPC .............................................. G06Q 20/00–425
See application file for complete search history.

(56) References Cited

U.S. PATENT DOCUMENTS

| 7,567,934 | B2 | 7/2009 | Flitcroft | |
| 7,705,728 | B2* | 4/2010 | Mock | G01S 5/0294 |
| | | | | 340/539.13 |
| 8,386,386 | B1 | 2/2013 | Zhu | |
| 9,953,323 | B2 | 4/2018 | Candelore | |
| 10,390,199 | B2* | 8/2019 | Johnson | G06Q 20/327 |
| 10,785,604 | B1* | 9/2020 | Kumar | G06V 20/593 |

(Continued)

OTHER PUBLICATIONS

Disclosed Anonymously, "IBM Security Services: PCI Compliance Advisory Services, Meet Your PCI DSS Requirements," https://www.ibm.com/security/services/pci-compliance-advisory-services, Jun. 5, 2020, pp. 1-4.

(Continued)

*Primary Examiner* — John W Hayes
*Assistant Examiner* — Chenyuh Kuo
(74) *Attorney, Agent, or Firm* — Tihon Poltavets

(57) ABSTRACT

A method for proximal distance and usage pattern access management includes identifying a first trigger event based on a financial device profile indicating a first proximal distance threshold is exceeded for a first device relative to a second device, where the first device is capable of executing financial transactions. The method further includes querying one or more network devices in the vicinity of the first device to validate the first trigger event. The method further includes responsive to receiving a first validation of the first trigger event from at least one network device from the one or more network devices, applying a first temporal lock on the first device preventing future executions of financial transactions. The method further includes responsive to validating a user associated with the second device, updating the financial device profile based on at least on the first trigger event and a location for the trigger event.

18 Claims, 7 Drawing Sheets

(56) References Cited

U.S. PATENT DOCUMENTS

| | | | | |
|---|---|---|---|---|
| 10,872,345 | B1* | 12/2020 | Walters | G06Q 20/202 |
| 11,468,472 | B2* | 10/2022 | Zoldi | G06Q 30/0269 |
| 2004/0203895 | A1 | 10/2004 | Balasuriya | |
| 2007/0249288 | A1 | 10/2007 | Moallemi | |
| 2010/0082487 | A1 | 4/2010 | Nelsen | |
| 2011/0092159 | A1 | 4/2011 | Park | |
| 2012/0040665 | A1 | 2/2012 | Liu | |
| 2015/0141045 | A1* | 5/2015 | Qiu | H04W 4/021 |
| | | | | 455/456.1 |
| 2016/0242004 | A1* | 8/2016 | Alharayeri | H04L 51/58 |
| 2016/0337863 | A1 | 11/2016 | Robinson | |
| 2018/0302416 | A1* | 10/2018 | Einberg | H04W 12/08 |
| 2020/0356981 | A1* | 11/2020 | Sofronas | G06Q 20/3278 |
| 2020/0380523 | A1* | 12/2020 | Agrawal | G06Q 20/3226 |
| 2022/0036361 | A1* | 2/2022 | Johnson | G06Q 20/40145 |

OTHER PUBLICATIONS

Green, "From Sneakers to Cash Registers: How Visa and IBM Will Change the World of Payments," VISA.com, https://usa.visa.com/visa-everywhere/innovation/visa-ibm-changing-digital-payments-and-iot.html, Jun. 5, 2020, pp. 1-4.

Heun, "How Mastercard, IBM Plan to Reinvent Security Under GDPR," https://www.paymentssource.com/news/how-mastercard-and-ibms-truata-plans-to-reinvent-security-under-gdpr?tag=00000150-f370-d7b7-a5f2-fbfc94cc0001, Apr. 11, 2018, pp. 1-2.

Ladika, "Credit Card On/Off Switches: More Card Issuers Adding Them," https://www.creditcards.com/credit-card-news/credit-card-on-off-switches.php, Feb. 19, 2018, pp. 1-2.

Lund, "IBM Is Changing the Payments Industry; Blockchain is Turning the Payments Industry on its Head," https://www.businessinsider.com/sc/ibm-payments-industry-blockchain-2017-10, Oct. 19, 2017, pp. 1-3.

Mell et al., "The NIST Definition of Cloud Computing", National Institute of Standards and Technology, Special Publication 800-145, Sep. 2011, pp. 1-7.

Ryan, "Chase Lets Customers Lock, Unlock Credit Cards From Their Phone and Computer," BusinessWire, https://www.businesswire.com/news/home/20180927005487/en/Chase-Lets-Customers-Lock-Unlock-Credit-Cards, Sep. 27, 2019, pp. 1-4.

Yagnik et al., . "Oulier [sic] analysis using frequent pattern mining—a review." International Journal of Computer Science and Information Technologies 5.1 (2014): 47-50.

Yao et al., "Anomaly detection using proximity graph and pagerank algorithm." IEEE Transactions on Information Forensics and Security 7.4 (2012): 1288-1300.

* cited by examiner

PROXIMAL DISTANCE AND USAGE PATTERN ACCESS MANAGEMENT

BACKGROUND

This disclosure relates generally to access management, and in particular to proximal distance and usage pattern access management.

Presently, on site commerce purchases are performed utilizing various electronic payment methods that include payment cards and mobile payments. Payments cards represent physical electronic authorization devices used to control access to a resource. Smart cards are an example of payment cards, which utilize an embedded integrated circuit chip with a pattern of metal contacts to electrically connect to the internal chip and/or include a contactless embedded integrated circuit chip to communicate with a terminal via near-field communication (NFC). A smart wallet can be utilized in conjunction with smart cards to track and secure one or more smart cards when not being utilized for a purchase. Mobile payments represent payment services operated under financial regulations and performed via a mobile device (e.g., smart phone) utilizing NFC.

SUMMARY

Embodiments in accordance with the present invention disclose a method, computer program product and computer system for proximal distance and usage pattern access management, the method, computer program product and computer system can identify a first trigger event based on a financial device profile indicating a first proximal distance threshold is exceeded for a first device relative to a second device, wherein the first device is capable of executing financial transactions. The method, computer program product and computer system can query one or more network devices in the vicinity of the first device to validate the first trigger event. The method, computer program product and computer system can responsive to receiving a first validation of the first trigger event from at least one network device from the one or more network devices, apply a first temporal lock on the first device preventing future executions of financial transactions. The method, computer program product and computer system can responsive to validating a user associated with the second device, update the financial device profile based on at least on the first trigger event and a location for the trigger event.

DETAILED DESCRIPTION

Embodiments of the present invention utilize proximal distance thresholds and usage patterns to manage access to a financial device associated with a user. Subsequent to receiving configuration settings for a device profile associated with the financial device, embodiments of the present invention initialize the financial device based on the configuration settings as defined by the device profile. By receiving movement data and usage data for the financial device, embodiments of the present invention determine patterns and thresholds for the financial device and update the device profile. Based on the device profile, embodiments of the present invention identify a trigger event and validate the trigger event based on one or more network devices in the vicinity of the financial device. Responsive to the one or more network devices validating the trigger event, embodiments of the present invention apply a temporal lock to the financial device. Responsive to a user being validated, embodiments of the present invention update the financial profile based on the trigger event. Alternatively, responsive to the user not being validated, embodiments of the present invention apply a hard lock on the financial device and notify the user associated with financial device of a potential security breach. Improvements to technology include a proactive system that monitors activates of a financial device with respect to a linked device to detect instances of potential security breaches.

Figure 1:
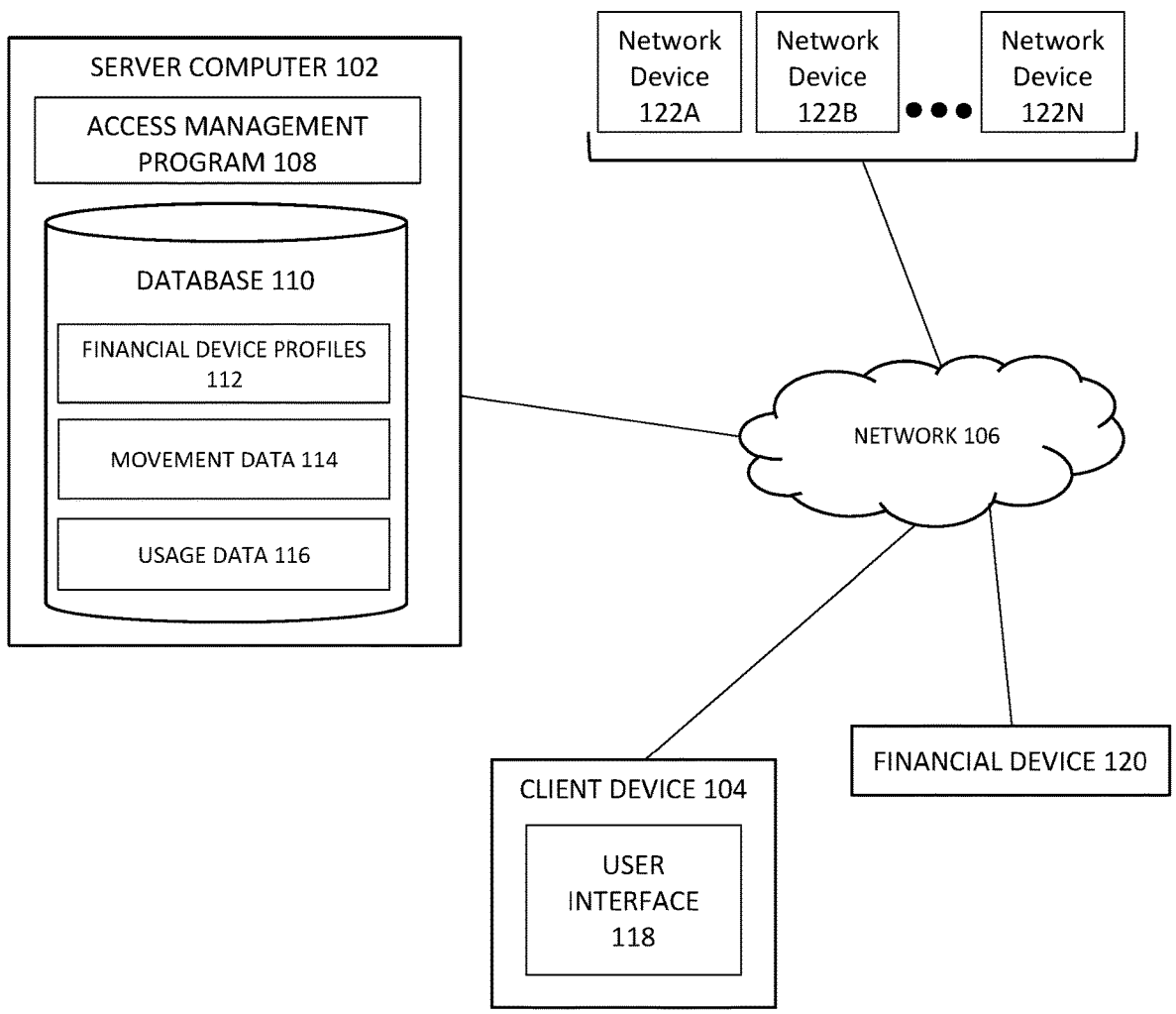
FIG. 1 is a functional block diagram illustrating a distributed data processing environment, in accordance with an embodiment of the present invention.

FIG. 1 is a functional block diagram illustrating a distributed data processing environment, in accordance with one embodiment of the present invention. The distributed data processing environment includes server computer 102, client device 104, financial device 120, and network device 122A, 122B, and 122N, all interconnected over network 106.

Server computer 102 may be a desktop computer, a laptop computer, a tablet computer, a specialized computer server, a smartphone, or any computer system capable of executing the various embodiments of access management program 108. In certain embodiments, server computer 102 represents a computer system utilizing clustered computers and components that act as a single pool of seamless resources when accessed through network 106, as is common in data centers and with cloud computing applications. In general, server computer 102 is representative of any programmable electronic device or combination of programmable electronic devices capable of executing machine-readable program instructions and communicating with other computer devices via a network. Server computer 102 has the ability to communicate with other computer devices (not illustrated in FIG. 1) to query the computer devices for information. In this embodiment, server computer 102 includes access management program 108 capable of communicating with database 110, where database 110 includes financial device profiles 112, movement data 114, and usage data 116.

Client device 104 may be a cellphone, smartphone, smartwatch, laptop, tablet computer, or any other electronic device capable of communicating via network 106. In general, client device 104 represents one or more programmable electronic devices or combination of programmable electronic devices capable of executing machine readable program instructions and communicating with other computing devices (not shown) within distributed data processing environment via a network, such as network 106. In one embodiment, client device 104 represents one or more devices associated with a user. Client device 104 includes user interface 118, where user interface 118 enable a user of client device 104 to interact with access management program 108 on server computer 102. Financial device 120 represents a device capable of executing an electronic payment, where financial device 120 can be connected (i.e., paired) to client device 104. In one embodiment, financial device 120 is a smart card that includes an embedded integrated circuit chip with a pattern of metal contacts to electrically connect to the internal chip and/or a contactless embedded integrated circuit chip to communicate with a terminal via near-field communication (NFC). Embodiments where financial device 120 is a smart card, a smart wallet can be utilized to track and secure financial device 120. In another embodiments, financial device 120 is a mobile phone (e.g., smartphone) or smartwatch capable of executing a mobile payment utilizing NFC.

Access management program 108 utilizes financial device profiles 112, movement data 114, and usage data 116 to determine usage patterns and proximal distance thresholds for financial device 120. Access management program 108 receives configuration settings for financial device profile 112 associated with financial device 120 and initializes financial device 120 based on the configuration settings. As a user utilizes financial device 120 to execute an electronic payment, access management program 108 receives movement data 114 based on a location of financial device 120 and receives usage data 116 based on a purchase for which financial device 120 executed the electronic payment. Access management program 108 determines usage patterns and proximal distance thresholds for financial device 120 based on the movement data 114 and the usage data 116. Subsequently, access management program 108 updates financial device profile 112 for financial device 120 based on the determined usage patterns and proximal distance thresholds for financial device 120. Access management program 108 utilize an iterative machine learning process to continuously update financial device profile 112 with movement data 114, usage data 116, and determined usage patterns and proximal distance thresholds for financial device 120.

Access management program 108 determines whether to initialize financial device profile 112 for financial device 120 by determining if another iteration of the machine learning process is required to update financial device profile 112. Responsive to determining not initialize financial device profile 112 for financial device 120, access management program 108 reverts back to perform another iteration of the machine learning process and receives additional movement data 114 and usage data 116. Responsive to determining to initialize financial device profile 112 for financial device 120, access management program 108 monitors financial device 120 to identify a trigger event based on financial device profile 112. Responsive to identifying a trigger event based on financial device profile 112 for financial device 120, access management program 108 queries network devices 122A, 122B, and 122N for validation of the trigger event. It is to be noted, network device 122A represents a first network device, network device 122B represents a second network device, and network device 122N represents a final network device in a vicinity of financial device, where network device 124N can for example represent a fifth network device or a seventh network device in the vicinity of financial device 120. Network device 122A, 122B, and 122N represents any Internet of Things (IoT) device capable of connecting and exchanging data with other devices (e.g., sever computer 102, client device 104, and financial device 120) and systems over network 106.

Responsive to access management program 108 determining network device 122A, 122B, and 122N could not confirm the trigger event, access management program 108 reverts back to monitoring financial device 120 to identify another trigger event based on financial device profile 112. Responsive to access management program 108 determining network device 122A, 122B, and 122N could confirm the trigger event, access management program 108 determines to apply a temporal lock on financial device 120 to prevent any future electronic payments from occurring for a predetermined amount of time.

Subsequent to applying the temporal lock on financial device 120, access management program 108 determines whether the user of financial device 120 can be validated during the occurrence of the trigger event. Responsive to validating the user of financial device 120, access management program 108 updates financial device profile 112 based on the trigger event and reverting back to monitoring financial device 120 to identify another trigger event based on financial device profile 112. Responsive to not validating the user of financial device 120, access management program 108 determines to apply a hard lock on financial device 120 and notifies a known user associated with the financial device via client device 104 (e.g., smartphone, smartwatch) associated with the known user. Access management program 108 displays in user interface 118 on client device 104 a notification stating that a hard lock was applied to financial device 120 based on a trigger event and a failure to validate the user of financial device 120. In embodiments where financial device 120 is a smartphone or smartwatch, access management program 108 notifies the known user associated with financial device 120 utilizing one or more previously stored methods of contacting the known user of financial device 120 (e.g., email address).

Database 110 is a repository for data utilized by sensor event coverage program 108 such as, financial device profiles 112, movement data 114, and usage data 116. In the depicted embodiment, database 110 resides on server computer 102. In another embodiment, database 110 may reside on client device 104 or elsewhere within distributed data processing environment provided access management program 108 has access to database 110. Database 110 can be implemented with any type of storage device capable of storing data and configuration files that can be accessed and utilized by generated design program 108, such as a database server, a hard disk drive, or a flash memory.

Financial device profiles 112 provide usage patterns and proximal distance thresholds for various financial devices 120, where each financial device profile 112 is associated with a single financial device 120. Access management program 108 can receive configuration settings for financial device 120 from a user, a financial institution, and/or a mobile payment provider associated with financial device 120. Access management program 108 stores the configuration settings for financial device profile 112 and utilizes the configuration settings as base usage patterns and proximal distance thresholds for financial device 120. As access management program 108 receives movement data 114 and usage data 116 for financial device 120, access management program 108 determines usage patterns and proximal distance thresholds based on movement data 114 and usage data 116. Movement data 114 represents one or more locations that access management program 108 identifies for financial device 120 and usage data 116 represents one or more instances of utilization (e.g., financial transaction) that access management program 108 identifies for financial device 120. Access management program 108 updates financial device profile 112 with the determined usage patterns and proximal distance threshold, where an update of financial device profile 112 represents an iteration of the machine learning process. Access management program 108 can associate movement data 114 and usage data 116 with a specific point in time and a specific financial device (e.g., financial device 120) and store movement data 114 and usage data 116 in database 110.

In general, network 106 can be any combination of connections and protocols that will support communications between server computer 102, client device 104, financial device 120, and network device 122A, 122B, and 122N. Network 106 can include, for example, a local area network (LAN), a wide area network (WAN), such as the Internet, a cellular network, or any combination of the preceding, and can further include wired, wireless, and/or fiber optic connections. In one embodiment, access management program 108 can be a web service accessible via network 106 to a user of client device 104. In another embodiment, access management program 108 may be operated directly by a user of server computer 102.

Figure 2A:
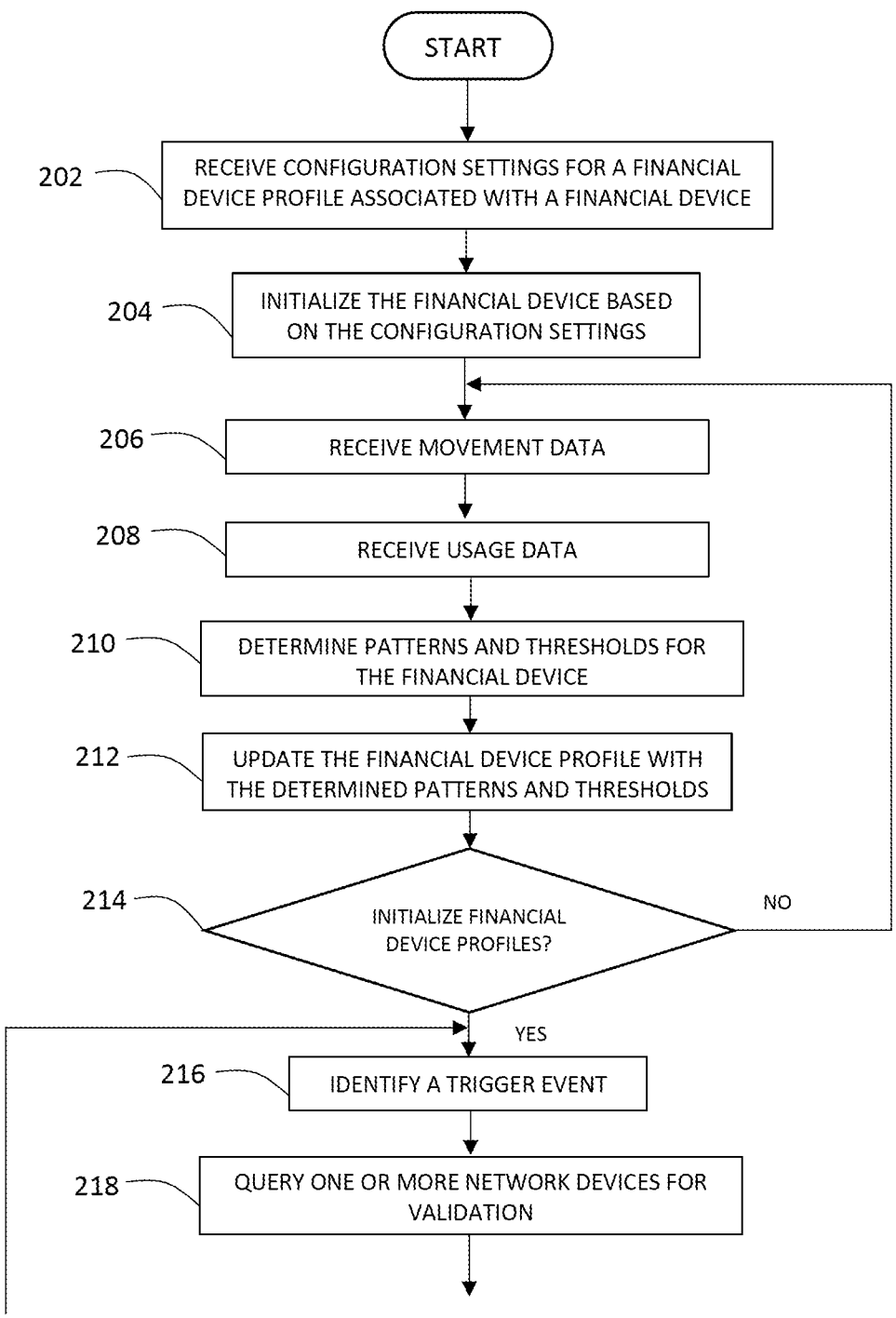
FIG. 2A is a flowchart depicting operational steps of an access management program, on a server computer within the distributed data processing environment of FIG. 1, for providing sensor network event coverage, in accordance with an embodiment of the present invention.

FIG. 2A is a flowchart depicting operational steps of an access management program, on a server computer within the distributed data processing environment of FIG. 1, for providing sensor network event coverage, in accordance with an embodiment of the present invention.

An access management program allows for dynamic triggering of service enablement or disablement for a valuable asset (e.g., a financial device) associated with a user for a temporal period based on determined proximal distance thresholds and usage patterns for the valuable asset. The service enablement or disablement of the financial device is based on a monitoring of a user's profile (i.e., financial device profile) in a geospatial environment in correlation with activities being performed in order to configure a timer for controlling access restrictions on a service associated with the financial device. The access management program performs a setup process that allows a user to connect the financial device to a linked device (e.g., mobile phone) associated with the user via a wireless pairing protocol mechanism. The access management program can receive configuration preferences with a base proximal distance threshold and timer configured by the user, where the access management program stores the base proximal distance threshold for the financial device. Based on pre-established user privacy settings for the financial device, the access management program can collect movement data and usage data for the financial device, in conjunction with calendar data motored from the linked device to establish a pattern history for the financial device and associated user. Various network devices (e.g., IoT devices) in the vicinity of the financial device can provide additional movement data and usage data for the financial device, where the access management program can receive the additional movement data and usage data for utilization in a machine learning process for determining proximal distance thresholds and usage patterns.

The access management program generates proximal distance thresholds by monitoring a user's proximal distance via the linked device with respect to the financial device to determine the proximal distance threshold for the timer to be activate or deactivated for controlling accessing restriction to the financial device. The access management program monitors the financial device with respect to the linked device associated with the user and if the linked device at time interval X during task Y is greater than Z meters (i.e., trigger event), the access management program activates the timer. In other embodiments, the access management program utilizes a geofenced area surrounding the financial device to determine whether the proximal distance threshold was reach and/or exceeded. Subsequent to the activation of the timer, the access management program can query one or more network devices to validate the trigger event. If a timer threshold is reached and the one or more network devices validated the trigger event, the access management program applies a temporal lock restricting access to the financial device, where the financial device can no longer be utilized to execute a financial transaction. If the linked device associated with user remains outside the geofenced zone for a predetermined amount of time and/or a user is not validated during the temporal lock utilizing a trusted device (e.g., linked device), a hard lock restricting access to the financial device is applied to the financial device. However, if the user enters the geofenced zone of the financial device, the access management program restores function to the financial device and removes the access restriction.

Access management program 108 receives configuration settings for a financial device profile associated with a financial device (202). Configuration settings represent base usage patterns and base proximal distance thresholds for the financial device profile as defined by a user, a financial institution, and/or a mobile payment provider associated with the financial device. Base usage patterns represent base rules for financial transactions performed by the user associated with the financial device. For example, a base usage pattern can include access management program 108 applying a temporal lock on the financial device for financial transactions occurring outside of the region associated with a billing address of a user associated with the financial device. In another example, a base usage pattern can include access management program 108 applying a temporal lock on the financial device for financial transactions above a threshold value (e.g., x>$1000) and allowing financial transaction at or below the threshold value (e.g., x≤$1000). In yet another example, a base usage pattern can include access management program 108 applying a temporal lock on the financial device for financial transactions above a threshold value (e.g., x>$500), where the financial device is outside of a geofence area as defined by a base proximal distance threshold (e.g., x>100 meters).

Base proximal distance thresholds represent base geofence areas with relation to the financial device and/or one or more locations. For example, a base proximal distance for a financial device can include a geofence area as defined by a circle that includes a radius of 100 meters. Access management program 108 can apply a temporal lock on the financial device for financial transactions if a user with a linked device (i.e., mobile device) is located more than 100 meters with regards to the financial device. In another example, a base proximal distance for a financial device can include a geofence area as defined by a footprint area of a structure (e.g., home improvement store) in which the financial device is location. Access management program 108 can apply a temporal lock on the financial device for financial transactions if a user with a linked device is located outside of the footprint area of the structure in which the financial device is located. Alternatively, access management program 108 can apply a temporal lock on the financial device for financial transactions if a user with a linked device is located inside the footprint of the structure, while the financial device is located outside of the footprint of the structure.

Access management program 108 also has the ability to apply different base proximal distance thresholds for one or more locations. In one example, for a location with a denser gathering of individuals (e.g., conference arenas, stadiums), access management program 108 can utilize a smaller base proximal distance threshold (e.g., 10 meters versus 100 meters) compared to a location with a less dense gathering of individuals (e.g., residential house). In another example, for a location with random individuals (e.g., conference arenas, stadiums), access management program 108 can utilizes a smaller base proximal distance threshold (e.g., 10 meters versus 100 meters) compared to a location (e.g., office building) with associated individuals (e.g., co-workers). Furthermore, access management program 108 can apply multiple base proximal distance thresholds for a single location for different time periods. For example, for location A, access management program 108 applies a first base proximal distance threshold of 100 meters for the hours between 9 AM and 9 PM and a second base proximal distance threshold of 10 meters for all other hours.

Access management program 108 initializes the financial device based on the configuration settings (204). In this embodiment, access management program 108 establishes a connection between the financial device and a linked device (e.g., smartphone, smartwatch) associated with the user via a wireless pairing protocol mechanism. In one example, a financial device is a smart card that utilizes NFC technology to execute a financial transaction and the linked device is a smartphone. In another example, a financial device is a smartphone that utilizes NFC technology to execute a financial transaction and the linked device is a smartwatch. In yet another example, a financial device is a smart wallet that include one or more financial cards and the linked device is a smartphone, where the smart wallet is capable of establishing a connection to the smartphone. Access management program 108 utilizes the established connection between the financial device and the linked device to determine whether a proximal distance threshold was exceeded, and a trigger event was detected. Access management program 108 initializes the financial device by applying to the financial device, the base usage patterns and base proximal distance thresholds received as configuration settings of the financial device profile. Subsequent to initialization of the financial device, the user utilizes the financial device to perform financial transactions at various locations.

Access management program 108 receives movement data (206). As previously discussed, movement data represents one or more locations that access management program 108 identifies for the financial device. Access management program 108 can receive movement data for the financial device for each instance the financial device is utilized for a financial transaction. For example, if the user arrives at a hotel to reserve a room and the financial device is utilized by the user to reserve the room, access management program 108 utilizes a known location for the hotel as movement data for the financial device. Access management program 108 can also receive movement data for the financial device for each instance the financial device establishes an internet connect to a surrounding network (e.g., public Wi-Fi, cellular network) and/or on an interval basis (e.g., every minute), if a constant internet connection is present through which access management program 108 can receive movement data for the financial device. The user has the option to dictate when access management program 108 can receive movement data for the financial device. In another example, access management program 108 receives movement data for the linked device that is connected to the financial device. Access management program 108 can query the linked device to determine whether the financial device is still connected to the linked device and responsive to determining the financial device is still connected to the linked device, access management program 108 can receive the movement data for the linked device for utilization as the movement data for the financial device.

Access management program 108 receives usage data (208). As previously discussed, usage data represents one or more instances of utilization (e.g., financial transaction) that access management program 108 identifies for the financial device, where each instance of utilization includes an associated time stamp for when the utilization occurred. In one example, a user is a utilizing a smartphone as a financial device and access management program 108 receives usage data for the financial device when the user utilizes the smartphone to complete a purchase at a home improvement store. In another example, a user is utilizing a smartphone as a financial device and access management program 108 received usage data for the financial device when the user utilized the smartphone to complete a mobile payment for a restaurant order that is being collected at the restaurant location. In yet another example, a user is utilizing a smart card as a financial device and access management program 108 receives usage data from a linked device for the financial device when the user utilizes the smart card to complete a hotel reservation. The linked device determines the smart card was utilized to complete a transaction and access management program 108 receives the usage data from the linked device for the transaction executed by the smart card.

Access management program 108 determines patterns and thresholds for the financial device (210). Access management program 108 utilizes an iterative machine learning process to determine usage patterns and proximal distance thresholds based on the received movement data and usage data for a specific point in time. Access management program 108 compares the movement data and the usage received in (206) and (208) to the base usage patterns and the base proximal distance thresholds received in the configuration settings (202) and/or any historic usage patterns and proximal distance thresholds determined in a previous iteration of the machine learning process. Based on the comparison, access management program 108 determines usage patterns and proximal distance thresholds for the financial device.

In one example, a user attends a technology conference at a hotel, where the user carries a financial device while attending the conference but leaves a linked device (e.g., smartphone, smartwatch) in a hotel room to not interrupt a presentation. However, during the technology conference the user utilizes the financial device to purchase a drink. For the purchase of the drink at the technology conference, access management program 108 receives movement data and usage data for the financial transaction (i.e., drink purchase). Access management program 108 determines a usage pattern based on the received movement data, usage data, and the historic usage patterns and proximal distance thresholds for the financial transaction at hotels by the user. Access management program 108 determines a usage pattern that indicates that when the user executes a financial transaction utilizing the financial device within a hotel (i.e., structure), the linked device is located within the hotel but greater than a base proximal distance threshold of 10 meters established via received configuration settings. Access management program 108 determines to update the proximal distance threshold of 10 meters to a geofence as defined by a footprint of the structure (i.e., hotel).

In another example, a user is at an international airport, where the user with a financial device and a linked device purchases an item at a duty-free store. Access management program 108 receives movement data and usage data for the financial transaction (i.e., duty-free purchase). Access management program 108 determines a usage pattern that indicates when the user executes a financial transaction utilizing the financial device at the international airport, the linked device is located within a base proximal distance threshold of 10 meters established via received configuration settings. Furthermore, access management program 108 has the ability to determine how dense (i.e., how busy) a location (i.e., airport) is at the specific point in time for the financial transaction based on publicly available data for the location. If access management program 108 determines there is a denser gathering of individuals at the location for the specific point in time, access management program 108 determines to update the proximal distance threshold from 10 meters to 2 meters. If access management program 108 determines there is a lesser dense gathering of individuals at the location for the specific point in time, access management program 108 affirms the base proximal distance threshold previously established with the received configuration settings. Access management program 108 has the ability to increase and decrease a proximal distance threshold based on a location and/or a density for a gathering of individuals at the location for a specific point in time.

Access management program 108 updates the financial device profile with the determined patters and thresholds (212). For previously stored usage patterns and proximal distance thresholds, access management program 108 updates the previously stored usage patterns and proximal distance thresholds for the financial device profile. Access management program 108 can utilize time stamps associated with the received movement data and usage data utilized to update the financial device profile with the usage patterns and proximal distance threshold for a specific time period. For newly determined usage patterns and proximal distance thresholds, access management program 108 updates the financial device profile with the newly determined usage patterns and proximal distance thresholds. Access management program 108 also stores the received movement data and usage data, along with the associated time stamps in a database for subsequent utilization as historic movement data and historic usage data.

Access management program 108 determines whether to initialize the financial device profiles (decision 214). In one embodiment, access management program 108 utilizes a total iteration count (e.g., one hundred iterations) for the machine learning process to determine whether enough movement data and usage data for the financial device associated with the user was received to establish financial device profiles for identifying trigger events. In another embodiment, access management program 108 utilizes a stabilization iteration count (e.g., five iterations) for the machine learning process, where the stabilization count represents an amount of times movement data and usage data was collected where there were no updates to the financial device profiles. In the event access management program 108 determines to initialize the financial device profiles ("yes" branch, decision 214), access management program 108 identifies a trigger event (216). In the event access management program 108 determines not to initialize the financial device profiles ("no" branch, decision 214), access management program 108 reverts back to (206) to receive movement data for the financial device.

Access management program 108 identifies a trigger event (216). Access management program 108 initializes the financial device profile for the financial device and monitors the activates of the financial device relative to the linked device, to identify a trigger event based on the usage patterns and the proximal distance thresholds of the financial device profile. A trigger event represents an instance where the financial device exceeds a proximal distance threshold relative to the linked device based on the usage patterns of the financial profile. For each trigger event, access management program 108 identifies a trigger event where a linked device at time interval (X) and during task (Y) is more than distance (Z) away from a financial device. In one example, access management program 108 identifies a trigger event where a financial device is located within a footprint of a structure (e.g., hotel) but a linked device is located outside of the footprint of the structure during a financial transaction that occurs at the structure. In another example, access management program 108 identifies a trigger event where a financial device is located a distance (e.g., 15 meters) that exceeds a proximal distance threshold (e.g., 10 meters) relative to a linked device while at given location (e.g., sports arena). In some embodiment, access management program 108 utilizes a timer when to confirm an identified trigger event. In the event access management program 108 determines a proximal distance threshold is exceeded for a predetermined amount of time (e.g., 5 minutes), access management program 108 confirms the identified trigger event. In the event access management program 108 determines a proximal distance threshold was not exceed for a predetermined amount of time, access management program 108 labels the identified trigger event as erroneous.

Access management program 108 queries one or more network devices for validation (218). Access management program 108 identifies a location for the financial device and subsequently, identifies one or more network devices in the vicinity of the financial device to query for validation. Access management program 108 can identify the location for the financial device by querying the financial device for a location, querying the linked device for a last known location where the financial device did not exceed the proximal distance threshold, or identifying a location for a last known financial transaction executed by the financial device. Subsequent to identifying the location for the financial device, access management program 108 queries one or more network device in a vicinity (e.g., 30 meter radius) to confirm the trigger event. In one example, access management program 108 identifies a location for the financial device as a lobby of a hotel and queries one or more cameras in the hotel to locate the financial device utilizing object identification software. In another embodiment, access management program 108 identifies a location for the financial device as a hardware store and queries one or more cameras on a payment kiosk to locate the financial device. In yet another embodiment, access management program 108 identifies one or more network devices that can electronically communicate with the financial device (e.g., Wi-Fi, NFC), where the one or more network devices send a ping to detect whether the financial device is in the vicinity.

Figure 2B:
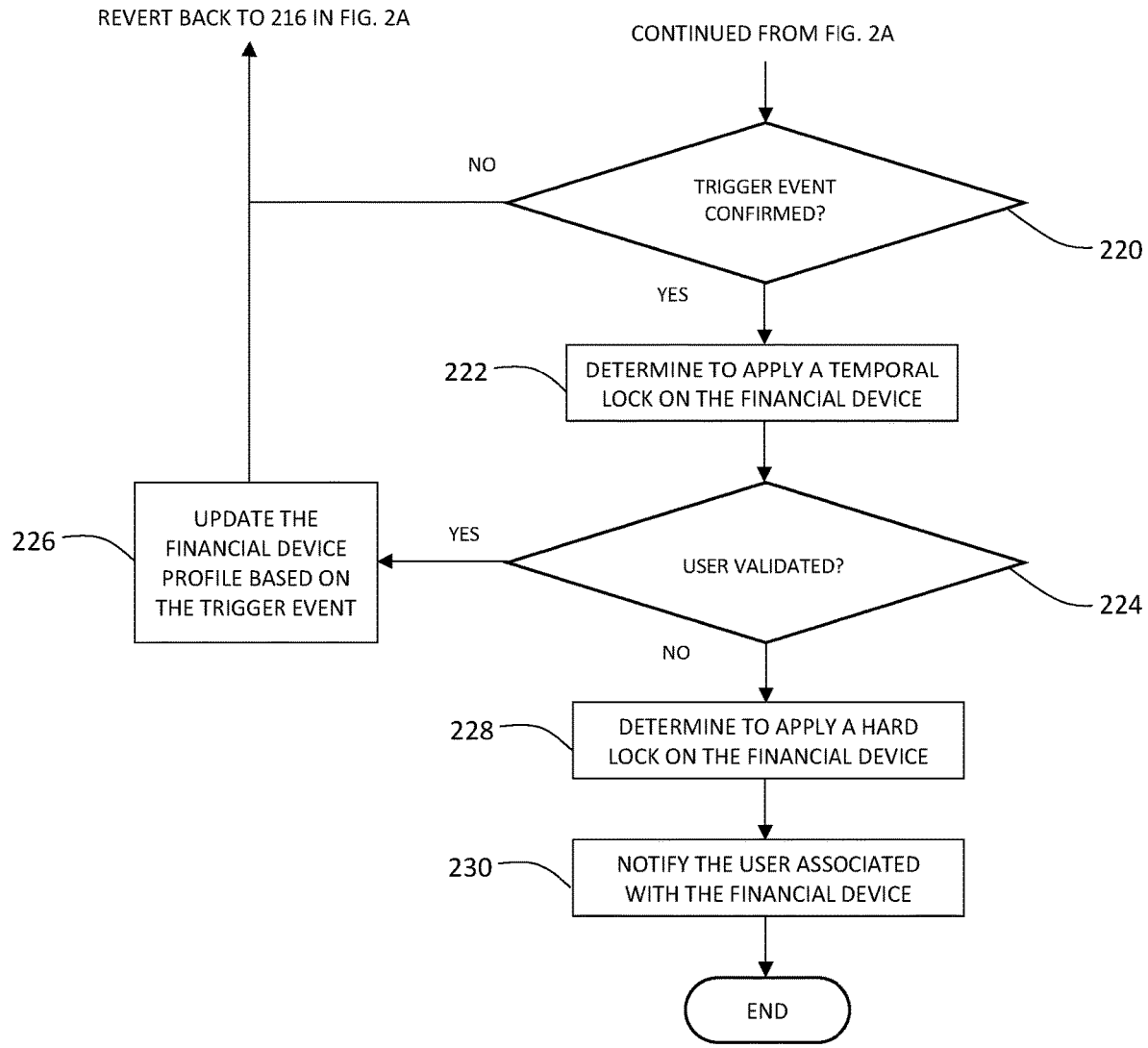
FIG. 2B is a continued flowchart from FIG. 2A depicting operational steps of an access management program, on a server computer within the distributed data processing environment of FIG. 1, for providing sensor network event coverage, in accordance with an embodiment of the present invention.

FIG. 2B is a continued flowchart from FIG. 2A depicting operational steps of an access management program, on a server computer within the distributed data processing environment of FIG. 1, for providing sensor network event coverage, in accordance with an embodiment of the present invention.

Access management program 108 determines whether the trigger event confirmed by the one or more network devices (decision 220). In the event access management program 108 determines the trigger event was confirmed by the one or more network devices ("yes" branch, decision 220), access management program 108 determines to apply a temporal lock on the financial device (222). The one or more network devices confirm a location for the financial device and access management program 108 utilizes the confirmed location of the financial device and a known location of the linked device to determine that the proximal distance threshold has been exceeded. In the event access management program 108 determines the trigger event was not confirmed by the one or more network devices ("no" branch, decision 220), access management program 108 reverts back to (216) to identify another trigger event. Access management program 108 can send a notification to the linked device associated with the user stating that a trigger event has occurred due to a proximal distance threshold being exceeded between the linked device and the financial device. In some embodiments, access management program 108 confirms a trigger event based on a timer, where the proximal distance threshold between the financial device and the linked device was exceeded for a predetermined amount of time.

Access management program 108 determines to apply a temporal lock on the financial device (222). Access management program 108 applies a temporal lock on the financial device which can be time-based and/or action based. For a time-based temporal lock, access management program 108 applies a temporary lock on the financial device to prevent financial transactions that lasts a predetermined amount of time (e.g., 30 minutes). The pre-determined amount of time can be defined by the user of the financial device or defined by financial institution associated with the financial device and stored with the financial device profile. For an action based temporal lock, access management program 108 applies a temporary lock on the financial device to prevent financial transactions until the user of the financial device has performed an action acknowledging the identified trigger event. In one embodiment, access management program 108 sends a notification via a text message to the linked device (e.g., smartphone) associated with the user, where a user views the notification in a user interface and selects a button acknowledging receipt of the notification.

Access management program 108 determines whether the user is validated (decision 224). In one embodiment, access management program 108 validates the user by determining whether the proximal distance threshold is still exceeded between the financial device and the linked device. In another embodiment, access management program 108 validates the user by determining whether the user has performed an action (i.e., acknowledging the identified trigger event) to release the temporal lock. In the event access management program 108 determines the user is validated ("yes" branch, decision 224), access management program 108 updates the financial profile based on the trigger event (226) and reverts back to (216) to identify another trigger event. In the event access management program 108 determines the user is not validated ("no" branch, decision 224), access management program 108 determines to apply a hard lock on the financial device (228).

Access management program 108 updates the financial profile based on the trigger event (226). In this embodiment, access management program 108 updates the financial profile based on the trigger event in the event access management program 108 received a user acknowledgement of the trigger event and a confirmation to release the temporal lock. Access management program 108 release the temporal lock on the financial device and access management program 108 updates the financial profile based on the trigger event, for future instances with a similar location and similar time of occurrence. Access management program 108 reverts back to (216) to identify another trigger event.

Access management program 108 determines to apply a hard lock on the financial device (228). In this embodiment, access management program 108 applies a hard lock on the financial device that would require replacement of the financial device, such as, a new smartcard or a new smartphone. In another embodiment, access management program 108 applies a hard lock on the financial device that would require contacting the financial institution for the financial device to go through a multi-step verification of the user. Access management program 108 notifies the user associated with the financial device (230). Access management program 108 notifies the user utilizing one or more previously stored communication methods of contacting the known user of financial device. In one embodiment, access management program 108 notifies the user associated with the financial device utilizing a method that does not include the linked device. For example, access management program 108 sends a notification to a primary email address for the known user associated with the financial device and/or a secondary email address for the known user associated with the financial device.

Figure 3:
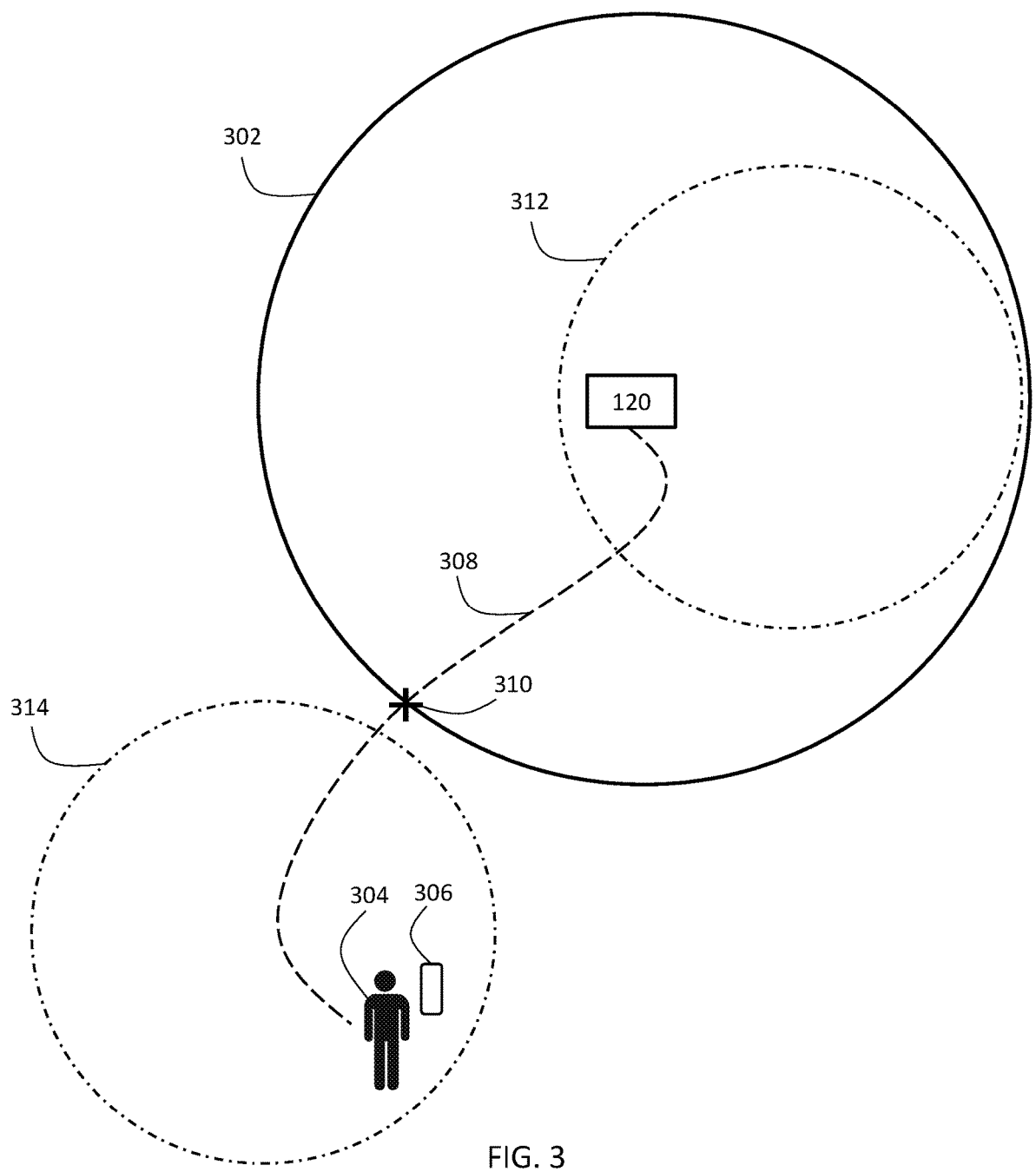
FIG. 3 illustrates an example of the access management program restricting access to financial device based on proximal distance and usage patterns, in accordance with an embodiment of the present invention.

FIG. 3 illustrates an example of the access management program restricting access to financial device based on proximal distance and usage patterns, in accordance with an embodiment of the present invention.

In this example, financial device 120 includes a proximal distance threshold as defined by area 302, where user 304 with linked device 306 has exceed the proximal distance threshold. User 304 traveled along path 308 and exceed the proximal distance threshold at point 310. At point 310, access management program 108 identifies a trigger event and queries one or more network devices in the vicinity of financial device 120. In this embodiment, a first network device has observation area 312, where observation area 312 includes financial device 120. Access management program 108 can receive validation from the first network device that confirms a location of financial device 120. A second network device has an observation area 314, where the observation area 314 includes user 304 with linked device 306. In this embodiment, access management program 108 can receive validation from the second network device that confirms a location of linked device 306. Alternatively, access management program 108 queries linked device 306 directly to obtain a location for user 304. Access management program 108 confirms the trigger event utilizing the first network device and the second network device and applies a temporal lock on financial device 120 to temporarily prevent financial transactions. Access management program 108 maintains the temporal lock until user 304 with linked device 306 re-enters area 302 and no longer exceeds the proximal distance threshold. As discussed with regards to FIG. 2B, access management program 108 can validate user 304 and determine whether to apply a hard lock on financial device 120 or release the temporal lock on financial device 120, update a financial device profile for financial device 120 based on the trigger event, and revert back to identifying another trigger event.

In one embodiment, access management program 108 utilizes generative crowdsourced data from other financial device locking events from other user in geographical (historic) proximity to show areas with higher risk for financial device owners. These areas include a higher density of individuals where a financial device is easily misplaced, such as, airports and conference centers, and allows users to be aware of financial device usage when entering an area with a high number of trigger events relating to the higher density of people.

In another embodiment, access management program 108 performs risk modeling prediction through profile-based statistic modeling usage. For profiled users with similar and/or matching financial device profiles, access management program 108 establishes a risk profile on unique qualities of when access management program 108 applies the temporal lock and the hard lock on the financial device. Through profile-based evolution, access management program 108 is able to derive time series forecasting for the profile data over time, allowing for access management program 108 to establish classical probability models. Access management program 108 can compare profiles, where a positive match between profiles allows for risk-based models to drive probabilities for risk at various geographical location and a negative match between profile allow for normal behavior theory to be applied.

Figure 4:
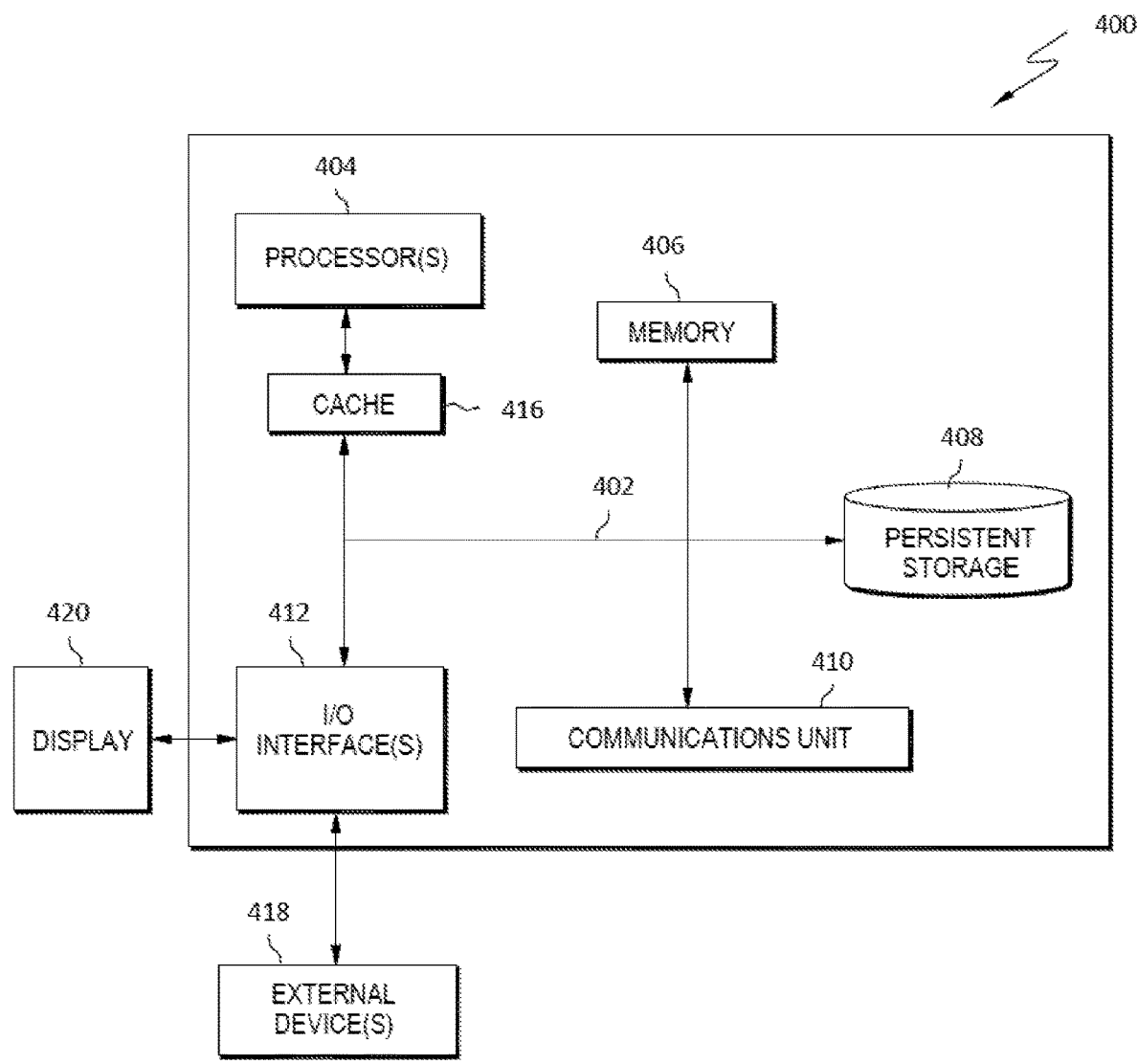
FIG. 4 depicts a block diagram of components of the server computer executing the sensor event coverage program within the distributed data processing environment of FIG. 1, in accordance with an embodiment of the present invention.

In yet another embodiment, access management program 108 utilizes generic and specific third-party validation and verification. Access management program 108 allows a user to utilize a form of reverse verification, where access management program 108 logs usage patterns and categorizes them as a generic usage pattern or a specific usage pattern. In an example of a generic usage pattern, a user takes a business flight most weeks in a given year and access management program 108 detects often seeing In-Flight Wi-Fi Provider A providing a connection for the financial device and the linked device to verify travel and transaction activity. In another example of a generic usage pattern, access management program 108 utilizes quantity and other peripheral mesh network data patter to verify financial device activities. Access management program 108 determines a user goes to a coffee shop ever workday and is surrounded by at least six other network devices and a workday where the user does not go to the coffee shop, access management program 108 can classify as a risk. In an example of a generic usage pattern, a user typically interacts with a bank account at work, where the work location is determined by a passing user in the hallway with a connected network device. Since the user passes through the proximal distance threshold of the financial device, the mere presence of a third-party device (i.e., the passing user with the network device) allows for access management program 108 to validate the financial device FIG. 4 depicts a computer system, where server computer 102 is an example of a computer system that can include access management program 108. The computer system includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
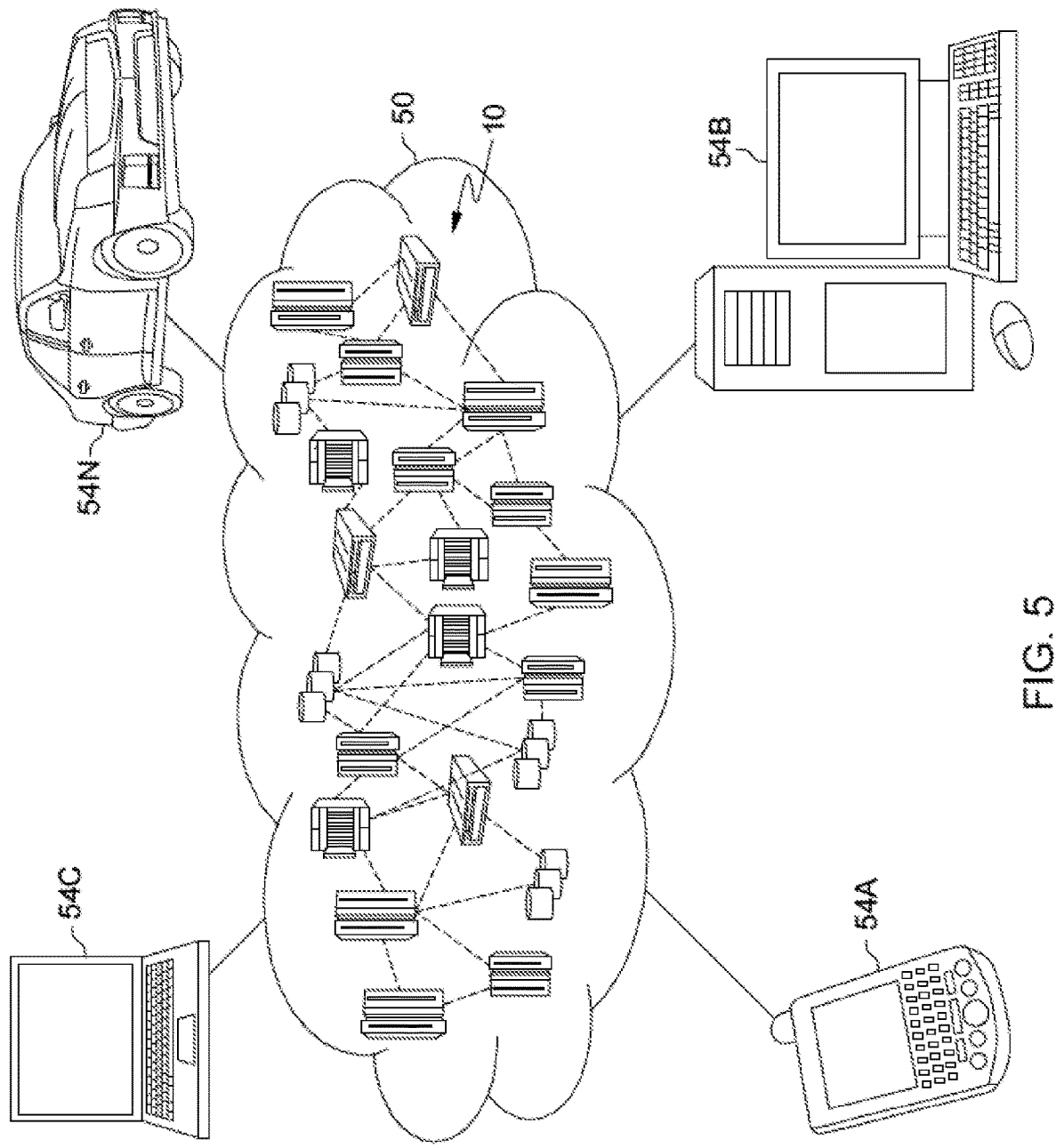
FIG. 5 depicts a cloud computing environment in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 6:
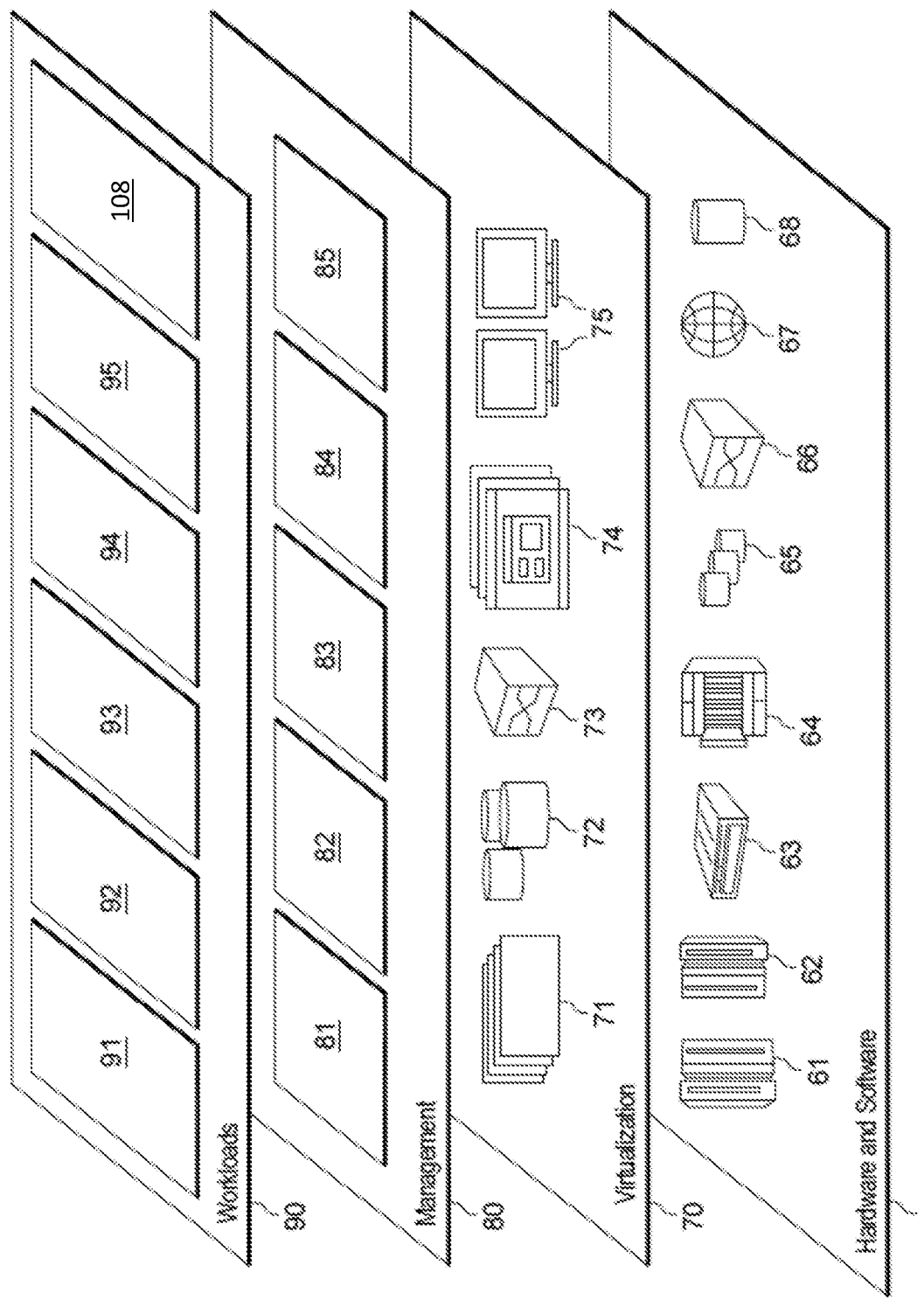
FIG. 6 depicts abstraction model layers in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and access management program 108.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   identifying, by one or more processors, a first trigger event based on a financial device profile, wherein the first trigger event indicates a first proximal distance threshold is exceeded for a first device associated with a user relative to a second device associated with the user, and wherein the first device is capable of executing financial transactions;
   querying, by the one or more processors, the first device for a last known location where the first device did not exceed the first proximal distance relative to the second device;
   identifying, by the one or more processors, a first network device at the last known location for the first device and a second network device at a location of the second device, wherein the first network device is positioned in a vicinity of the first device at the last known location and the second network device is position in a vicinity of the second device;
   querying, by the one or more processors, the first network device in the vicinity of the first device and the second network device in the vicinity of the second device to confirm a first location for the first device and a second location for the second device;
   responsive to receiving a first confirmation from the first network device of the first location for the first device and a second confirmation from the second network device of second location for the second device, validating, by the one or more processors, the first trigger event based on the first confirmation and the second confirmation;
   applying, by the one or more processors, a first temporal lock on the first device preventing future executions of financial transactions based on the validating of the first trigger event; and
   responsive to validating the user associated with the second device, updating, by the one or more processors, the financial device profile based at least on the first validation of the first trigger event and the first location for the first trigger event.

2. The method of claim 1, further comprising:
   receiving, by the one or more processors, configuration settings for the financial device profile associated with the first device, wherein the configuration setting includes at least one base usage pattern and one base proximal distance threshold; and
   initializing, by the one or more processors, the first device based on the configuration settings for the financial device profile.

3. The method of claim 2, further comprising:
   receiving, by the one or more processors, movement data for the first device and the second device;
   receiving, by the one or more processors, usage data for the first device, wherein the usage data includes at least one executed financial transaction at a location defined by the movement data;
   determining, by the one or more processors, a first usage pattern and the first proximal distance threshold for the movement data and the usage data; and
   updating, by the one or more processors, the financial device profile for the first device based on the first usage pattern and the first proximal distance threshold.

4. The method of claim 3, wherein updating the financial device profile for the first device further comprises:
   replacing, by the one or more processors, the one base usage pattern with the first usage pattern and the one base proximal distance threshold with the first proximal distance threshold.

5. The method of claim 3, wherein updating the financial device profile for the first device further comprises:
   storing, by the one or more processors, the first usage pattern and the first proximal distance threshold for the financial device profile, wherein the first usage pattern and the first proximal distance threshold are associated with a first location and the one base usage pattern and the one base proximal distance threshold are associated with a second location.

6. The method of claim 3, further comprising:
   determining, by the one or more processors, whether to initialize an updated financial device profile utilizing a stabilization iteration count for a machine learning process, wherein the stabilization iteration count represents a number of instances the movement data and the usage data was received; and
   responsive to determining the stabilization iteration count was reached, initializing, by the one or more processors, the financial device profile for the first device.

7. A computer program product comprising:
   one or more computer readable storage mediums and program instructions stored on at least one of the one or more storage mediums, the program instructions, which when executed by a processor, cause the processor to:

identify a first trigger event based on a financial device profile, wherein the first trigger event indicates a first proximal distance threshold is exceeded for a first device associated with a user relative to a second device associated with the user, and wherein the first device is capable of executing financial transactions;

query the first device for a last known location where the first device did not exceed the first proximal distance relative to the second device;

identify a first network device at the last known location for the first device and a second network device at a location of the second device, wherein the first network device is positioned in a vicinity of the first device at the last known location and the second network device is position in a vicinity of the second device;

query the first network device in the vicinity of the first device and the second network device in the vicinity of the second device to confirm a first location for the first device and a second location for the second device;

responsive to receiving a first confirmation from the first network device of the first location for the first device and a second confirmation from the second network device of second location for the second device, validate the first trigger event based on the first confirmation and the second confirmation;

apply a first temporal lock on the first device preventing future executions of financial transactions based on the validating of the first trigger event; and responsive to validating the user associated with the second device, update the financial device profile based at least on the first validation of the first trigger event and the first location for the first trigger event.

8. The computer program product of claim 7, further comprising program instructions, stored on the one or more computer readable storage mediums, which when executed by a processor, cause the processor to:

receive configuration settings for the financial device profile associated with the first device, wherein the configuration setting includes at least one base usage pattern and one base proximal distance threshold; and initialize the first device based on the configuration settings for the financial device profile.

9. The computer program product of claim 8, further comprising program instructions, stored on the one or more computer readable storage mediums, which when executed by a processor, cause the processor to:

receive movement data for the first device and the second device;

receive usage data for the first device, wherein the usage data includes at least one executed financial transaction at a location defined by the movement data;

determine a first usage pattern and the first proximal distance threshold for the movement data and the usage data; and update the financial device profile for the first device based on the first usage pattern and the first proximal distance threshold.

10. The computer program product of claim 9, wherein updating the financial device profile for the first device further comprises, program instructions, stored on the one or more computer readable storage mediums, which when executed by a processor, cause the processor to:

replace the one base usage pattern with the first usage pattern and the one base proximal distance threshold with the first proximal distance threshold.

11. The computer program product of claim 9, wherein updating the financial device profile for the first device further comprises, program instructions, stored on the one or more computer readable storage mediums, which when executed by a processor, cause the processor to:

store the first usage pattern and the first proximal distance threshold for the financial device profile, wherein the first usage pattern and the first proximal distance threshold are associated with a first location and the one base usage pattern and the one base proximal distance threshold are associated with a second location.

12. The computer program product of claim 9, further comprising program instructions, stored on the one or more computer readable storage mediums, which when executed by a processor, cause the processor to:

determine whether to initialize an updated financial device profile utilizing a stabilization iteration count for a machine learning process, wherein the stabilization iteration count represents a number of instances the movement data and the usage data was received; and responsive to determining the stabilization iteration count was reached, initialize the financial device profile for the first device.

13. A computer system comprising:

one or more computer processors;

one or more computer readable storage media; and program instructions stored on the computer readable storage media for execution by at least one of the one or more computer processors, the program instructions comprising:

program instructions to identify a first trigger event based on a financial device profile, wherein the first trigger event indicates a first proximal distance threshold is exceeded for a first device associated with a user relative to a second device associated with the user, and wherein the first device is capable of executing financial transactions;

program instructions to query the first device for a last known location where the first device did not exceed the first proximal distance relative to the second device;

program instructions to identify a first network device at the last known location for the first device and a second network device at a location of the second device, wherein the first network device is positioned in a vicinity of the first device at the last known location and the second network device is position in a vicinity of the second device;

program instructions to query the first network device in the vicinity of the first device and the second network device in the vicinity of the second device to confirm a first location for the first device and a second location for the second device;

program instructions to, responsive to receiving a first confirmation from the first network device of the first location for the first device and a second confirmation from the second network device of second location for the second device, validate the first trigger event based on the first confirmation and the second confirmation;

program instructions to apply a first temporal lock on the first device preventing future executions of financial transactions based on the validating of the first trigger event; and program instructions to responsive to validating the user associated with the second device, update the financial device profile based at least on the first validation of the first trigger event and the first location for the first trigger event.

14. The computer system of claim 13, wherein the program instructions stored on the one or more computer readable storage media further comprise:
program instructions to receive configuration settings for the financial device profile associated with the first device, wherein the configuration setting includes at least one base usage pattern and one base proximal distance threshold; and
program instructions to initialize the first device based on the configuration settings for the financial device profile.

15. The computer system of claim 14, wherein the program instructions stored on the one or more computer readable storage media further comprise:
program instructions to receive movement data for the first device and the second device;
program instructions to receive usage data for the first device, wherein the usage data includes at least one executed financial transaction at a location defined by the movement data;
program instructions to determine a first usage pattern and the first proximal distance threshold for the movement data and the usage data; and
program instructions to update the financial device profile for the first device based on the first usage pattern and the first proximal distance threshold.

16. The computer system of claim 15, wherein program instructions to update the financial device profile for the first device further comprises:
program instructions to store the first usage pattern and the first proximal distance threshold for the financial device profile, wherein the first usage pattern and the first proximal distance threshold are associated with a first location and the one base usage pattern and the one base proximal distance threshold are associated with a second location.

17. The computer system of claim 15, wherein the program instructions stored on the one or more computer readable storage media further comprise:
program instructions to determine whether to initialize an updated financial device profile utilizing a stabilization iteration count for a machine learning process, wherein the stabilization iteration count represents a number of instances the movement data and the usage data was received; and
program instructions to, responsive to determining the stabilization iteration count was reached, initialize the financial device profile for the first device.

18. The computer system of claim 15, wherein program instructions to update the financial device profile for the first device further comprises:
program instructions to replace the one base usage pattern with the first usage pattern and the one base proximal distance threshold with the first proximal distance threshold.

* * * * *